United States Patent
Chen et al.

(10) Patent No.: US 11,861,225 B2
(45) Date of Patent: Jan. 2, 2024

(54) MANAGEMENT UNIT BASED MEDIA MANAGEMENT OPERATIONS IN MEMORY DEVICES

(71) Applicant: Micron Technology, Inc., Boise, ID (US)

(72) Inventors: Yueh-Hung Chen, Sunnyvale, CA (US); Jiangli Zhu, San Jose, CA (US); Chih-Kuo Kao, Fremont, CA (US); Fangfang Zhu, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 117 days.

(21) Appl. No.: 17/464,029

(22) Filed: Sep. 1, 2021

(65) Prior Publication Data

US 2023/0063407 A1 Mar. 2, 2023

(51) Int. Cl.
*G06F 3/06* (2006.01)
*G06F 12/02* (2006.01)

(52) U.S. Cl.
CPC .......... *G06F 3/0659* (2013.01); *G06F 3/0604* (2013.01); *G06F 3/0619* (2013.01); *G06F 3/0679* (2013.01); *G06F 12/0238* (2013.01)

(58) Field of Classification Search
CPC .... G06F 3/0659; G06F 3/0604; G06F 3/0619; G06F 3/0679; G06F 12/0238
See application file for complete search history.

(56) References Cited

U.S. PATENT DOCUMENTS

| | | | |
|---|---|---|---|
| 6,539,507 B1* | 3/2003 | Juenemann | G01R 31/318558 714/726 |
| 10,216,423 B1* | 2/2019 | Malwankar | G06F 3/064 |
| 2015/0169230 A1* | 6/2015 | Asnaashari | G06F 3/0631 711/103 |
| 2016/0299690 A1* | 10/2016 | Jung | G06F 3/0688 |
| 2018/0173461 A1* | 6/2018 | Carroll | G06F 3/0656 |
| 2021/0303206 A1* | 9/2021 | Saxena | G06F 3/061 |

* cited by examiner

*Primary Examiner* — Sean D Rossiter
(74) *Attorney, Agent, or Firm* — Lowenstein Sandler LLP

(57) ABSTRACT

Systems and methods are disclosed including a processing device operatively coupled to memory device. The processing device performs operations comprising generating a super management unit (SMU) memory access command; splitting the SMU memory access command into a plurality of management unit (MU) memory access commands; indexing, in an index data structure, each MU memory access command of the plurality of MU memory access commands; issuing, to the memory device, a sequence of MU memory access commands from the plurality of MU memory access commands; receiving an indication that a MU memory access command from the sequence of MU memory access commands is completed; and responsive to determining that the completed MU memory access command satisfies a criterion, issuing an available MU memory access command based on an index value of the available MU memory access command.

16 Claims, 5 Drawing Sheets

INDEX METADATA TABLE 300

| MU ID | Index |
|---|---|
| MU 305 | 0 |
| MU 310 | 1 |
| MU 315 | 2 |
| MU 320 | 3 |
| . . . | . . . |
| MU 375 | N |

FIG. 3

CONTROL REGISTER 400

| BIT | STATUS |
|---|---|
| 0 | 1 |
| 1 | 0 |
| 2 | 0 |
| 3 | 0 |
| 4 | 1 |
| 5 | 1 |
| 6 | 0 |
| 7 | 1 |
| 8 | 1 |
| 9 | 0 |
| 10 | 0 |
| 11 | 0 |
| 12 | 0 |
| 13 | 0 |
| . . . | . . . |
| N | N |

FIG. 4A

CONTROL REGISTER METADATA TABLE 410

| BIT | MU ID |
|---|---|
| 0 | MU 305 |
| 1 | MU 310 |
| 2 | MU 315 |
| 3 | MU 320 |
| 4 | MU325 |
| 5 | MU 330 |
| 6 | MU 335 |
| 7 | MU 340 |
| 8 | MU 345 |
| 9 | MU 350 |
| 10 | MU 355 |
| 11 | MU 360 |
| 12 | MU 365 |
| 13 | MU 370 |
| . . . | . . . |
| N | MU 375 |

FIG. 4B

MANAGEMENT UNIT BASED MEDIA MANAGEMENT OPERATIONS IN MEMORY DEVICES

TECHNICAL FIELD

Embodiments of the disclosure generally relate to memory sub-systems, and more specifically, relate to improved memory performance using management unit based media management operations in memory devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIG. 3 schematically illustrates example metadata maintained by the memory sub-system controller, in accordance with some embodiments of the present disclosure.

FIG. 4A schematically illustrates an example control register maintained by the memory sub-system controller, in accordance with some embodiments of the present disclosure.

FIG. 4B schematically illustrates example metadata maintained by the memory sub-system controller, in accordance with some embodiments of the present disclosure.

DETAILED DESCRIPTION

Figure 1:
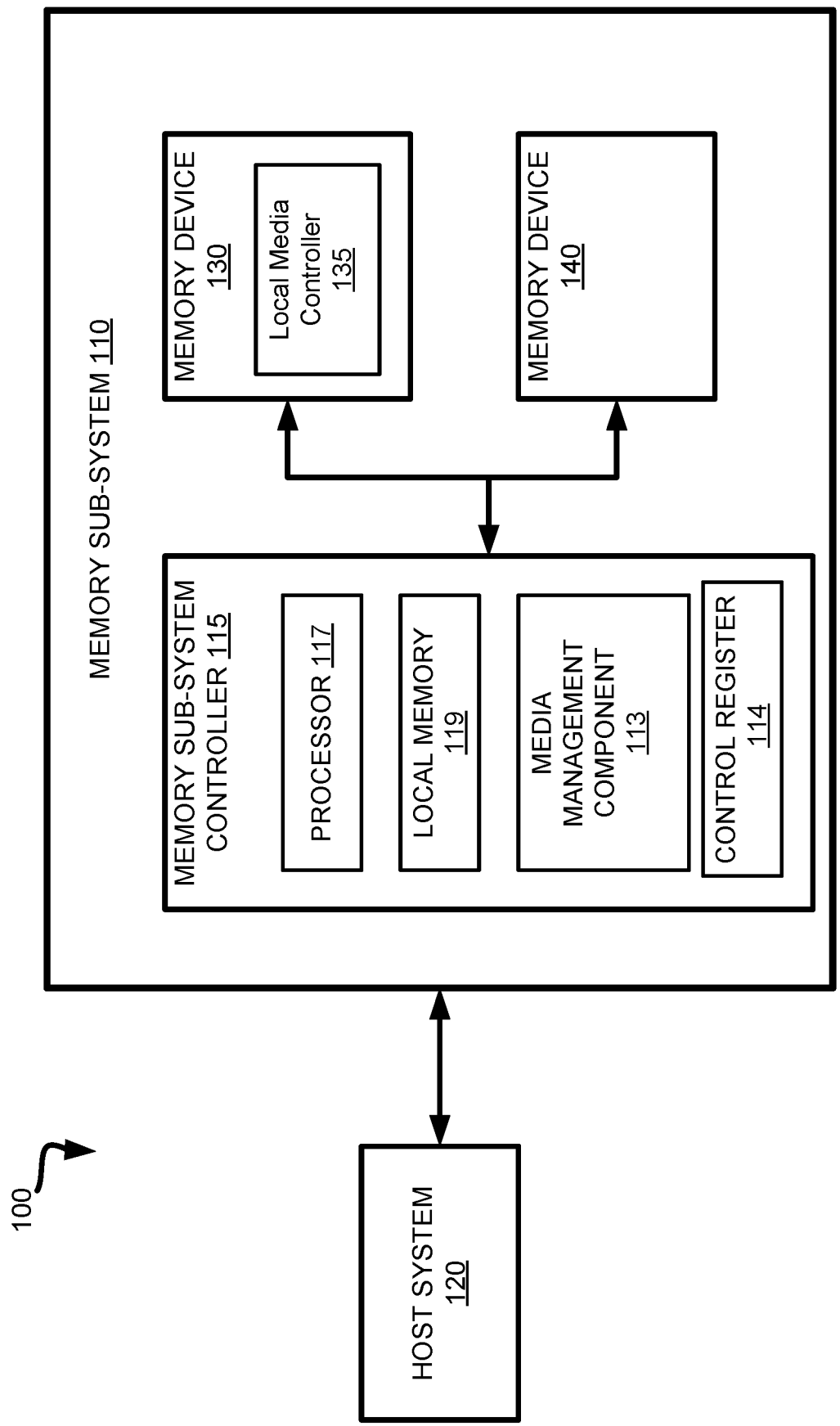
FIG. 1 illustrates an example computing system that includes a memory sub-system in accordance with some embodiments of the present disclosure.

Aspects of the present disclosure are directed to performing management unit based media management operations in memory devices. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can include two or more planes. For some types of non-volatile memory devices (e.g., NAND devices), each plane includes of a set of physical blocks. In some implementations, each block can include multiple sub-blocks. Each plane carries a matrix of memory cells formed onto a silicon wafer and joined by conductors referred to as wordlines and bitlines, such that a wordline joins multiple memory cells forming a row of the matric of memory cells, while a bitline joins multiple memory cells forming a column of the matrix of memory cells.

Depending on the cell type, each memory cell can store one or more bits of binary information, and has various logic states that correlate to the number of bits being stored. The logic states can be represented by binary values, such as "0" and "1", or combinations of such values. A set of memory cells referred to as a memory page can be programmed together in a single operation, e.g., by selecting consecutive bitlines.

The non-volatile memory devices can include three-dimensional cross-point ("3D cross-point") memory devices that are a cross-point array of non-volatile memory that can perform bit storage based on a change of bulk resistance, in conjunction with a stackable cross-gridded data access array. Such non-volatile memory devices can be divided into multiple management units (MUs), such as pages or blocks of the memory device. An MU can be a group of pages across dice and/or channels. An MU can represent an individual segment of the memory device that can be written or erased in a single operation. In one example, an MU can correspond to a logical block size (e.g., a data transfer size of a host and/or a data management size of a memory system), which can be, for example, 4 KB. The MU can be mapped to a physical set of memory cells. However, embodiments are not so limited. For example, an MU can correspond to more than a logical block size when a group of memory cells storing user data and overhead data (e.g., data informative of other data stored within the group of memory cells) corresponds to more than a logical block size. Although memory devices such as 3D cross-point type memory are described, an MU can be defined for other type of memory, such as negative-and (NAND) and random access memory (RAM), For example, an MU can be a page of data in NAND media or a logical block of data in RAM.

MUs can be grouped into larger groups of data management units referred to herein as a super management unit (SMU). While an MU can be the unit of media that controls decoding and storing of data, an SMU can be used to perform wear leveling features, refresh operations, and other larger scale management of the memory device. An SMU can be used for these larger scale operations because large amounts of resources could be required to perform these operations on each individual MU.

In some memory sub-systems, an SMU memory access operation is split into multiple MU memory access operations. Memory access operations can be performed by the memory sub-system. The memory access operations can be host-initiated operations or memory sub-system controller initialed. For example, the host system can initiate a memory access operation (e.g., write operation, read operation, erase operation, etc.) on a memory sub-system. The host system can send memory access commands (e.g., write command, read command) to the memory sub-system, such as to store data on a memory device at the memory sub-system and to read data from the memory device on the memory sub-system. The data to be read or written, as specified by a host request, is hereinafter referred to as "host data". A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., ECC codeword, parity code), data version (e.g. used to distinguish age of data written), valid bitmap (which LBAs or logical transfer units contain valid data), etc. Memory access operations initiated by the memory sub-system controller can relate to maintenance operations, such as garbage collection, wear leveling, bad block management, block refresh operations, etc.

When a SMU memory access command is split into multiple MU memory access commands, one or more of the MU memory access command can experience an error, causing the SMU memory access operation to timeout. For example, a two-kilobyte (KiB) SMU memory access command can be split into 2047 MU memory access commands. The memory sub-system controller can issue all 2047 MU memory access command, and three of the MU memory access commands can experience an error. Current memory sub-systems may be unable to determine that a MU memory access command experienced the error until a time-out command is issued after a significant delay. Furthermore, current memory sub-systems cannot determine which MU memory access command experienced the error without performing media scan on the memory device, which further increases the memory sub-system system latency.

Aspects of the present disclosure address the above and other deficiencies by implementing media management operations, in memory devices, based on an MU index value and operation window. In some embodiments, responsive to generating a SMU memory access command, the memory sub-system controller can split the SMU memory access command into multiple MU memory access commands (based on, for example, memory size, logical addresses, physical addresses, etc.). For example, a two-kilobyte (KiB) SMU memory access command can be split into 2047 MU memory access commands. Each MU memory access command can be indexed, by the memory sub-system controller, in a data structure (e.g., a metadata table). In one example, each MU memory access command can be sequentially numbered in the metadata table. The MU memory access commands can be ordered based on logical addresses, physical addresses, positions in the SMU, priority, etc. The memory sub-system controller can include a control register to track the status of the MU memory access command issued to the memory device. In some embodiments, the control register can use status bits to indicate whether a MU memory access command is pending, completed, has yet to be issued, etc. For example, the control register can use a binary value of 1 to indicate that a MU memory access command is pending, and a binary value of 0 to indicate that a MU memory access command is completed or has yet to be issued.

The memory sub-system controller can track, using the control register, pending MU memory access commands (e.g., MU memory access commands issued to the memory device) and issue a new MU memory access command. The amount of MU memory access commands issued, by the memory sub-system controller to the memory device, can be limited by an operation window. The operation window can be a value that defines the maximum number of MU memory access commands that the memory sub-system controller can issue based on the lowest index of a pending MU memory access command. Specifically the memory sub-system controller can issue a certain number of indexed memory access commands from the lowest indexed pending MU memory access command. For example, if the value of the operation window is 10, and the lowest pending index MU memory access command is 22, then the memory sub-system controller can issue 9 additional memory access command indexed 23-31, for a total of 10 pending MU memory access commands. Each of the ten pending memory access commands can be correlated, by the memory sub-system controller, to a status bit in the control register, where the status bits are set to the value 1 (indicating that a MU memory access command is pending). The value of the lowest pending indexed MU memory access command can limit additional MU memory access command regardless of whether any additional MU memory access command is completed. For example, if the value of the operation window is 10, the lowest pending index MU memory access command is 22, and MU memory access commands indexed 23-31 are completed, the memory sub-system controller will not issue MU memory access command indexed 32 (or any other higher indexed MU memory access commands) until the MU memory access command indexed as 22 is completed. Responsive to the memory device experiencing an error processing an issued MU memory access command, the memory sub-system controller can refer to the control register to determine which MU memory access command experienced the error. The memory sub-system controller can then perform error-correcting techniques (e.g., error correction code (ECC), etc.) or reissue the MU memory access command.

Advantages of the present disclosure include, but are not limited to, an improved performance of the memory device and an improved quality of service for the host system by tracking MU memory access commands and quickly determining which MU memory access command experienced an error. This allows the memory device to process multiple memory access commands without the latency produced by scanning the memory device to determine the MU memory access command responsive for the error. Thus, embodiments of the present disclosure reduce the amount of time memory device can process multiple MU memory access commands, which improves the performance of the memory device.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DEVIM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DEVIM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks. Some types of memory, such as 3D cross-point, can group pages across dice and channels to form management units (MUs). MUs are one example of a data unit. Super management units (SMUs) are another example of data units, and can include a set of multiple MUs (e.g. 1000 MUs, 2000 MUs, etc.)

The memory device 130 can include one or more decks. A deck can be defined as an array of memory cells with electronically conductive access lines. Multiple decks can be stacked within memory device 130. Each deck can have inherently different levels of endurance (e.g., an indication of approximately how many times the deck can be written to, read, and/or erased before physical wear causes the deck to fail).

Although non-volatile memory components such as 3D cross-point array of non-volatile memory cells and NAND type flash memory (e.g. 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random access memory (FeTRAM), ferroelectric random access memory (FeRAM), magneto random access memory (MRA1V1), Spin Transfer Torque (STT)-MRAM, conductive bridging RAM (CBRAM), resistive random access memory (RRA1V1), oxide based RRA1V1 (OxRA1V1), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as media management operations, garbage collection operations, error detection and error-correcting code (ECC) operations, encryption operations, caching operations, and address translations between a logical address (e.g., logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which includes a raw memory device 130 having control logic (e.g., local controller 132) on the die and a controller (e.g., memory sub-system controller 115) for media management within the same memory device package. An example of a managed memory device is a managed NAND (MNAND) device.

The memory sub-system 110 includes a media management component 113 that can be used to implement media management operations, in memory device 130, based on an MU operation window. In some embodiments, the memory sub-system controller 115 includes at least a portion of the media management component 113. In some embodiments, the media management component 113 is part of the host system 110, an application, or an operating system. In other embodiments, local media controller 135 includes at least a portion of media management component 113 and is configured to perform the functionality described herein.

The media management component 113 can generate SMU memory access commands. For example, the media management component 113 can generate a SMU memory access command for media management purposes. Media management component 113 can split the generated SMU memory access command into multiple MU memory access commands based on, for example, memory size, logical addresses, physical addresses, etc. In one example, media management component 113 can split the SMU memory access command into multiple MU memory access commands of a predetermined byte size (e.g., one-byte MU memory access commands, two-byte MU memory access commands, etc.). Once split, media management component 113 can index each MU memory access command in, for example, a data structure. For example, media management component 113 can maintain a data structure (e.g., a meta-data table) composed of multiple records, where each record correlates a MU memory access command (via an identifier) to a corresponding index value. The index values can be a sequential list of numbers. An example of the index meta-data table is shown in FIG. 3.

The memory sub-system controller 115 can include control register 114 to track the status of the MU memory access command issued (or scheduled to issue) to the memory device. In other embodiments, local media controller 135 includes at least a portion of control register 114 and is configured to perform the functionality described herein. In some embodiments, control register 114 can use status bits to indicate whether a MU memory access command is pending, completed, or is to be issued. In one embodiments, control register 114 can use a binary value of 1 to indicate that a MU memory access command is pending, and a binary value of 0 to indicate that a MU memory access command is completed or is to be issued. The media management component 113 use a control register metadata table to correlate an MU memory access command to a bit of the control register 114. An example of the control register is shown in FIG. 4A and an example of the control register metadata table is shown in FIG. 4B. Responsive to memory device 130, 140 experiencing an error processing an issued MU memory access command, the media management component 113 can refer to control register 114 to determine which MU memory access command experienced the error. Media management component 113 can then perform error-correcting techniques (e.g., error correction code (ECC), etc.) or reissue the MU memory access command.

The media management component 113 can track, using the control register 114, pending MU memory access commands. Media management component 113 can further use an operation window value and the value of the lowest indexed pending memory access command to determine which additional MU memory access commands to issue to memory device 130. Specifically, the highest indexed memory access command that the media management component 113 can issue is defined by the lowest indexed pending MU memory access command plus the value of the operation window, minus one. The operation window value can a programmable value configurable by the media management component 113. In some embodiments, the operation window value can be equal to or less than the number of bits managed by control register 114.

Figure 2:
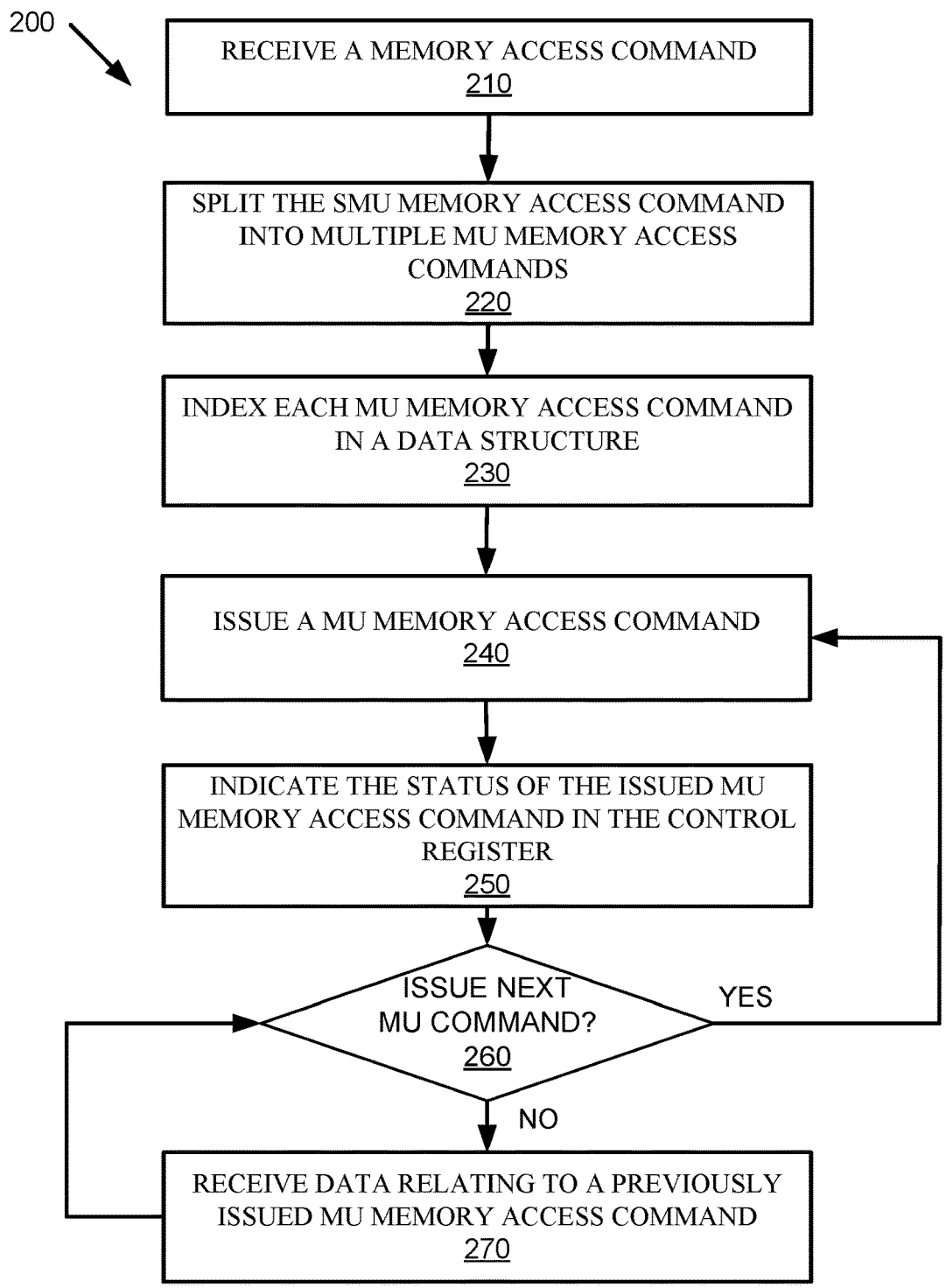
FIG. 2 is a flow diagram of an example method for performing media management operations, in accordance with some embodiments of the present disclosure.

FIG. 2 is a flow diagram of an example method 200 illustrating processes performed for media management operations, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the media management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, the processing logic generates an SMU memory access command. For example, the processing logic can receive one or more write commands, read commands, erase commands, etc, and generate the SMU memory access command. The SMU memory access command can specify a logical address.

At operation 220, the processing logic splits the SMU memory access command into multiple MU memory access commands. In some embodiments, the processing logic can split the SMU memory access command based on, for example, memory size, logical addresses, physical addresses, etc. In one example, the processing logic can split the SMU memory access command into MU memory access commands of a predetermined byte size. Each MU memory access command can specify a logical address. The processing logic can determine a physical address associated with the logical address. In some embodiments, the physical address can be located in an address space of one or more dies a memory device. The processing logic can determine a portion of the memory device that is referenced by the physical address. For example, the processing logic can use a table to determine which portion of the memory device includes the address space.

At operation 230, the processing logic indexes each MU memory access command in a data structure (e.g., a metadata table). The index metadata table can be composed of multiple records, where each record correlates a MU memory access command (via an identifier) to a corresponding index value, where the index values are a sequential list of numbers.

At operation 240, the processing logic issues a MU memory access command. In some embodiments, the processing logic can issue an available MU memory access command with the lowest index value in the metadata table. In one example, where no MU memory access commands have been issued yet, the processing logic can issue the MU memory access command corresponding to index value 0 in the metadata table. In another example, where at least one MU memory access command has been issued, the processing logic can determine whether to issue the next available MU memory access command based on whether the operation window value and the index value of the lowest indexed pending MU memory access command satisfy a criterion. For example, the processing logic can determine whether the index value of the next available MU memory access command is equal to or less than the sum of the lowest indexed pending MU memory access command plus the value of the operation window, minus one.

At operation 250, the processing logic indicates the status of the issued MU memory access command in the control register (e.g., control register 114). For example, the processing logic can, using a control register metadata table, assign the identifier of the issued MU memory access command to a status bit, and set the corresponding status bit of the control register to the value of 1.

At operation 260, the processing logic determines whether to issue a next available MU memory access command. In some embodiments, the processing logic can use an operation window value and the value of the lowest indexed pending MU memory access command to determine whether to issue the next available MU memory access commands to issue to memory device 130. For example, the processing logic can determine, using the control register and the metadata tables, the value of the lowest pending indexed memory access command. The processing logic can then add the operation window value to the index value of the memory access command, subtract one from the sum, and, based on the calculated value, determine whether the MU memory access command correlating to the determined value is issued and/or completed. Responsive to the MU memory access command being unissued, the processing logic proceeds to operation 240 and issues the MU memory access command to the memory device. Responsive to the MU memory access command being issued and/or completed, the processing logic proceeds to operation 270.

At operation 270, the processing logic receives data, from the memory device, relating to a previously issued MU memory access command. The processing logic can further indicate the status of the completed MU memory access command in the control register. For example, the processing logic can set the status bit assigned the identifier of the completed MU memory access command to the value of 0. The processing logic then proceeds to operation 260, to determine whether to issue the next available MU memory access command based on whether the completed MU memory access command satisfies a criterion. For example, the processing logic can determine whether the index value of the next available MU memory access command equal to or less than the sum of the lowest indexed pending MU memory access command plus the value of the operation window, minus one. In some embodiments, the processing logic can clear, from the control register metadata table, the assigned identifier of the completed MU memory access command after completing an iteration of operation 260. In other embodiments, the processing logic can clear, from the control register metadata table, the assigned identifier of the completed MU memory access command after completing a full cycle of assigning each other status bit in the control register.

FIG. 3 schematically illustrates example metadata maintained by the memory sub-system controller, in accordance with some embodiments of the present disclosure. In some embodiments, media management component 113 can maintain an index metadata table 300. In some embodiments, metadata table 300 can be stored in memory of the memory sub-system (e.g., at memory device 130, 140, local memory 119, etc.) and can be referenced by media management component 113 to determine the index value of a referenced MU memory access command identifier. As illustrated in FIG. 3, metadata table 300, by way of exemplary example, maintains entries that that correlate each MU memory access command of an SMU memory access command to an index value. Each MU memory access command can include an identifier. Media management component 113 can determine whether to issue, to the memory device, subsequent MU memory access commands using metadata table 300.

FIG. 4A schematically illustrates an example control register 400 maintained by the memory sub-system controller, in accordance with some embodiments of the present disclosure. FIG. 4B schematically illustrates example metadata maintained by the memory sub-system controller, in accordance with some embodiments of the present disclosure. In some embodiments, media management component 113 can maintain a control register metadata table 410. In some embodiments, media management component 113 can manage control register 400. As illustrated in FIG. 4A, control register 400, by way of exemplary example, maintains a bit that indicates the status of an assigned MU memory access command. In some embodiments, control register 400 can be a hardware element referenced by media management component 113 to determine the status of a corresponding MU memory access command. In some embodiments, control register metadata table 410 can be stored in memory of the memory sub-system (e.g., at memory device 130, 140, local memory 119, etc.) and can be referenced by media management component 113 to determine the MU memory access command (via an identifier) that correlates to a bit of control register 400. As illustrated in FIG. 4B, control register metadata table 410, by way of exemplary example, maintains entries that that correlate each bit of the control register 400 to an assigned MU memory access command of an SMU memory access command. A MU memory access command can be correlated to a bit of the control register 410 via an identifier. Media management component 113 can determine whether to issue, to the memory device, subsequent MU memory access commands using control register 400 and control register metadata table 410.

Figure 5:
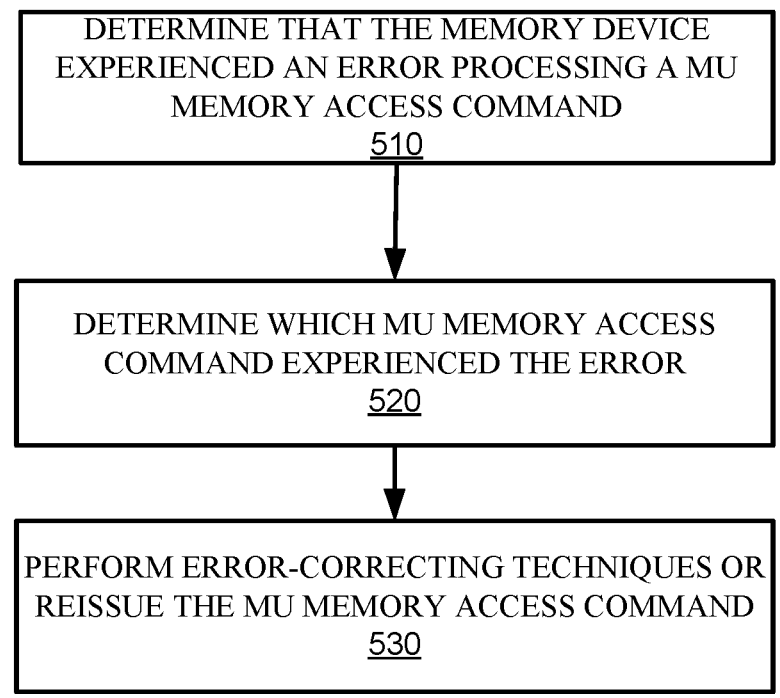
FIG. 5 is a flow diagram of an example method illustrating processes performed for determining which management unit memory access command experienced an error, in accordance with some embodiments of the present disclosure.

FIG. 5 is a flow diagram of an example method 500 illustrating processes performed for determining which MU memory access command experienced an error, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the media management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic can determine that the memory device experienced an error processing a MU memory access command. For example, the processing logic can determine that a timer, activated when the MU memory access command was issued, has expired (e.g., a timeout error).

At operation 520, the processing logic can determine which MU memory access command experienced the error. For example, the processing logic can look up, using the control register and metadata table(s), which pending memory access command has the lowest index value.

At operation 530, the processing logic can perform error-correcting techniques (e.g., error correction code (ECC), etc.) or reissue the MU memory access command.

Figure 6:
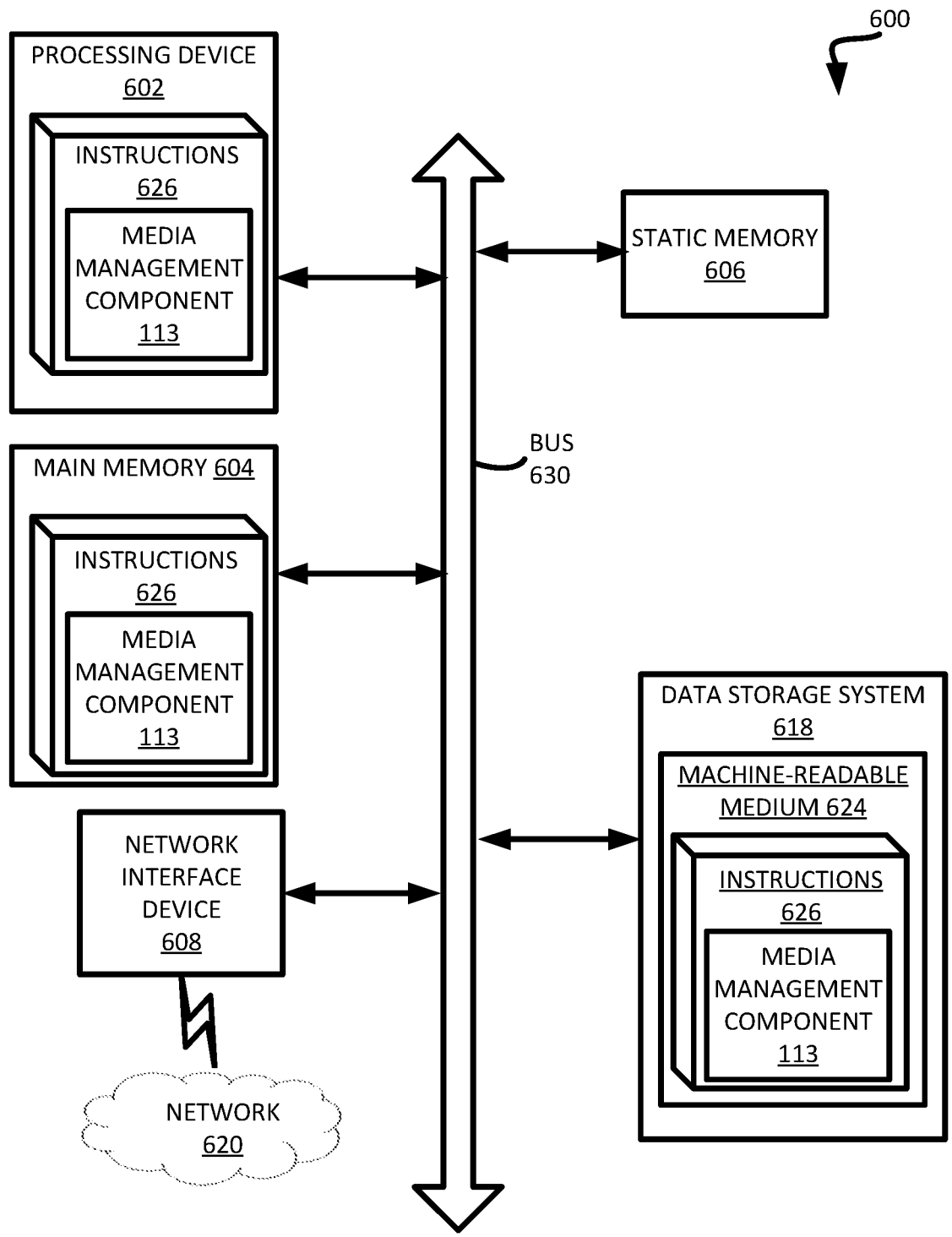
FIG. 6 is a block diagram of an example computer system in which embodiments of the present disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes or utilizes a memory sub-system (e.g., the memory sub-system 110 of FIG. 1) or can be used to perform the operations of a controller (e.g., to execute an operating system to perform operations corresponding to media management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630. Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to media management component 113 of FIG. 1. While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled with the memory device, to perform operations comprising:
generating a super management unit (SMU) memory access command;
splitting the SMU memory access command into a plurality of management unit (MU) memory access commands;
issuing, to the memory device, a sequence of MU memory access commands from the plurality of MU memory access commands;
recording a status of each MU memory access command from the sequence of MU memory access commands in a control register;
determining that a MU memory access command from the sequence of MU memory access commands experienced an error; and
identifying which MU memory access command experienced the error using the control register.

2. The system of claim 1, wherein the operations further comprise:
receiving an indication that a MU memory access command from the sequence of MU memory access commands is completed;
responsive to determining that the completed MU memory access command satisfies a criterion, issuing an available MU memory access command based on an index value of the available MU memory access command; and
responsive to determining that the completed MU memory access command does not satisfy the criterion, awaiting competition of another MU pending MU memory access command.

3. The system of claim 1, wherein an amount of MU memory access commands in the sequence of MU memory access commands is determined using an operation window value.

4. The system of claim 1, wherein splitting the SMU memory access command into a plurality of MU memory access commands is based on at least one of based on memory size, logical addresses, or physical addresses.

5. The system of claim 1, wherein the operations further comprise:
indexing, in an index data structure, each MU memory access command of the plurality of MU memory access commands, wherein the index data structure is composed of multiple records, where each record correlates an identifier of an MU memory access command to a corresponding index value, wherein the index values are a sequential list of numbers.

6. The system of claim 1, wherein the pr operations further comprise:
determining whether to issue an available MU memory access command by determining whether an index value of the available MU memory access command is equal to or less than a sum of a lowest indexed pending MU memory access command plus a value of an operation window, minus one.

7. A method comprising:
generating, by a processor, a super management unit (SMU) memory access command;
splitting the SMU memory access command into a plurality of management unit (MU) memory access commands;
issuing, to a memory device, a sequence of MU memory access commands from the plurality of MU memory access commands;
recording a status of each MU memory access command from the sequence of MU memory access commands in a control register;
determining that a MU memory access command from the sequence of MU memory access commands experienced an error; and
identifying which MU memory access command experienced the error using the control register.

8. The method of claim 7, wherein the control register is configured to indicate a pending status of one or more of the plurality of MU memory access commands.

9. The method of claim 7, wherein an amount of MU memory access commands in the sequence of MU memory access commands is determined using an operation window value.

10. The method of claim 7, wherein splitting the SMU memory access command into a plurality of MU memory access commands is based on at least one of based on memory size, logical addresses, or physical addresses.

11. The method of claim 7, further comprising an index data structure composed of multiple records, where each record correlates an identifier of an MU memory access command to a corresponding index value, wherein the index values are a sequential list of numbers.

12. A non-transitory computer-readable storage medium comprising instructions that, when executed by a processing device operatively coupled to a memory device, performs operations comprising:
generating a super management unit (SMU) memory access command;
splitting the SMU memory access command into a plurality of management unit (MU) memory access commands;
issuing, to the memory device, a sequence of MU memory access commands from the plurality of MU memory access commands;
recording a status of each MU memory access command from the sequence of MU memory access commands in a control register;
determining that a MU memory access command from the sequence of MU memory access commands experienced an error; and
identifying which MU memory access command experienced the error using the control register.

13. The non-transitory computer-readable storage medium of claim 12, wherein the operations further comprise:
receiving an indication that a MU memory access command from the sequence of MU memory access commands is completed
responsive to determining that the completed MU memory access command satisfies a criterion, issuing an available MU memory access command based on an index value of the available MU memory access command; and
responsive to determining that the completed MU memory access command does not satisfy the criterion, awaiting competition of another MU pending MU memory access command.

14. The non-transitory computer-readable storage medium of claim 12, wherein an amount of MU memory access commands in the sequence of MU memory access commands is determined using an operation window value.

15. The non-transitory computer-readable storage medium of claim 12, wherein the operations further comprise:
indexing, in an index data structure, each MU memory access command of the plurality of MU memory access commands, wherein splitting the SMU memory access command into a plurality of MU memory access commands is based on at least one of based on memory size, logical addresses, or physical addresses.

16. The non-transitory computer-readable storage medium of claim 12, wherein the operations further comprise:
determining whether to issue an available MU memory access command by determining whether an index value of the available MU memory access command is equal to or less than a sum of a lowest indexed pending MU memory access command plus a value of an operation window, minus one.

* * * * *